United States Patent [19]

Ojima et al.

[11] Patent Number: 4,908,813

[45] Date of Patent: Mar. 13, 1990

[54] WAVELENGTH MULTIPLEXING OPTICAL RECORDING APPARATUS

[75] Inventors: Masahiro Ojima; Motoyasu Terao, both of Tokyo; Yoshio Taniguchi, Hino; Shuji Imazeki, Kodaira; Yasushi Tomioka, Kokubunji, all of Japan

[73] Assignee: Hitachi, Ltd., Tokyo, Japan

[21] Appl. No.: 127,453

[22] Filed: Dec. 2, 1987

[30] Foreign Application Priority Data

Dec. 10, 1986 [JP] Japan .................................. 61-292310

[51] Int. Cl.⁴ .............................................. G11B 11/00
[52] U.S. Cl. .................................... 369/94; 250/226; 250/201; 369/45; 369/108
[58] Field of Search ...................... 369/93, 94, 95, 97, 369/102, 108, 44, 45; 250/201 DF, 226

[56] References Cited

U.S. PATENT DOCUMENTS

| | | | |
|---|---|---|---|
| 4,161,752 | 7/1979 | Basilico | 369/108 |
| 4,219,704 | 8/1980 | Russell | 369/108 |
| 4,450,547 | 5/1984 | Nakamura et al. | 369/45 |
| 4,525,826 | 6/1985 | Nakamura et al. | 369/46 |
| 4,737,947 | 4/1988 | Osato et al. | 360/59 |

OTHER PUBLICATIONS

Jenkins and White, *Fundamentals of Optics,* York, Pa., McGraw-Hill Book Co 1957, pp. 157-163.

*Primary Examiner*—Steven L. Stephan
*Attorney, Agent, or Firm*—Antonelli, Terry & Wands

[57] ABSTRACT

Disclosed is a wavelength multiplexing optical recording apparatus comprising laser sources radiating a plurality of laser beams of different wavelengths, an optical system for focusing the laser beams, and an optical recording medium having a plurality of optical recording layers with wavelength sensitivities for selective recording by said laser beams focused by said optical system. The optical recording layers of recording medium are laminated with distances between adjacent layers being made consistent with biased focal positions of the laser beams attributable to the chromatic aberration of the optical system, so that the laser beams are focused on the optical recording layers of corresponding wavelength sensitivities.

9 Claims, 2 Drawing Sheets

WAVELENGTH MULTIPLEXING OPTICAL RECORDING APPARATUS

CROSS-REFERENCE TO RELATED APPLICATION

This application relates to the subject matter described in U.S. patent application Ser. No. 766,271 filed on Aug. 16, 1985, entitled "Autofocusing Control System".

BACKGROUND OF THE INVENTION

This invention relates to a wavelength multiplexing optical recording apparatus using an optical recording medium made of a plurality of laminated optical recording layers having wavelength sensitivities, and particularly to a wavelength multiplexing optical recording apparatus suitable for accurately positioning a plurality of laser beams of different wavelengths.

Wavelength multiplexing recording is being proposed as an approach to a drastically enhanced recording density of the optical disk memory. As a recording medium for wavelength multiplexing recording, there is known organic dye molecule monolayers laminated by the Langmuir-Blodget method as described in Nikkei New Material, May 19, 1986, page 15.

The above conventional technique, however, does not consider the fact that a plurality of laser beams of different wavelengths have their focal positions biased in the direction normal to the recording layers due to the chromatic aberration of the focusing optical system, resulting in the inaccurate positioning of the laser beams to the respective recording layers.

SUMMARY OF THE INVENTION

This invention is intended to overcome the above-mentioned prior art deficiency, and its primary object is to provide a wavelength multiplexing optical recording apparatus operative to position the laser beams of different wavelengths accurately to the respective recording layers through the use of an optical recording medium made of a plurality of laminated optical recording layers having wavelength sensitivities.

Another object of this invention is to provide a wavelength multiplexing optical recording apparatus which minimizes the thermal crosstalk between recording layers.

A feature of this invention is that laminated recording layers, to which a plurality of laser beams of different wavelengths are focused by an optical system, have their lamination distances adjusted to the focal biasing caused by the chromatic aberration of the optical system, thereby allowing the laser beams to focus accurately on the respective recording layers having wavelength sensitivities.

Another feature of this invention is that a laminated optical recording medium has its final stage provided with a reflective layer, so that an off-focusing signal and/or off-tracking signal is detected using the laser beam with the wavelength assigned to the recording layer nearest to the reflective layer.

A further feature of this invention is that a plurality of laser beams of different wavelengths are focused on the recording layers with respective wavelength sensitivities using an optical system so that a focused laser spot does not lie over other layers, thereby minimizing the thermal crosstalk between recording layers.

Any optical system (lens) used for focusing a laser beam on a recording layer has some chromatic aberration, and therefore in focusing several laser beams of different wavelengths with an optical system, each laser beam has a different focal position on the optical axis due to the chromatic aberration of the system. This means that by making the lamination distances of the recording layers consistent with the interval of focal points of laser beams, each laser beam of a specific wavelength can focus on the corresponding one of recording layers having different wavelength sensitivities. This scheme enhances the light utilization efficiency for each recording layer in recording and reproduction, and also reduces the cross-talk between layers.

In case the whole laminated recording film has a thickness equal to or greater than the focal depth of a certain laser beam spot, a problem arises as to a laser beam of which wavelength should be used to provide a laser spot control signal used for automatic focusing and/or tracking.

In this respect, by providing a light reflective layer at the final stage of the laminated recording layers and reproducing information using the reflected light from the reflective layer, it becomes possible to make the reflective layer to be the target focal plane and to make a groove or pits formed on the reflective layer to be the target track. By using the laser beam of the wavelength corresponding to the recording layer closest to the reflective layer for the detection of off-focusing and/or tracking error, stable automatic focusing and/or tracking control is made possible based on that the distance between the reflective layer and the closest recording layer is sufficiently smaller than the focal depth of the laser beam spot. Other laser spots for the remaining recording layers are controlled for their positions automatically in unison with that for the layer closest to the reflective layer, since they have constant distances from that reference spot in terms of the focal depth direction and tracking error direction.

Placing a plurality of laser beam spots on the optical recording surface separately, without overlap, from one another not only in the focal depth direction, but also in the planar direction provides a further effect of reducing the degree of crosstalk recording when a local heat generation by the irradiation of recording laser pulses to one recording layer effects optical recording to other layers.

DESCRIPTION OF THE PREFERRED EMBODIMENTS

Figure 1:
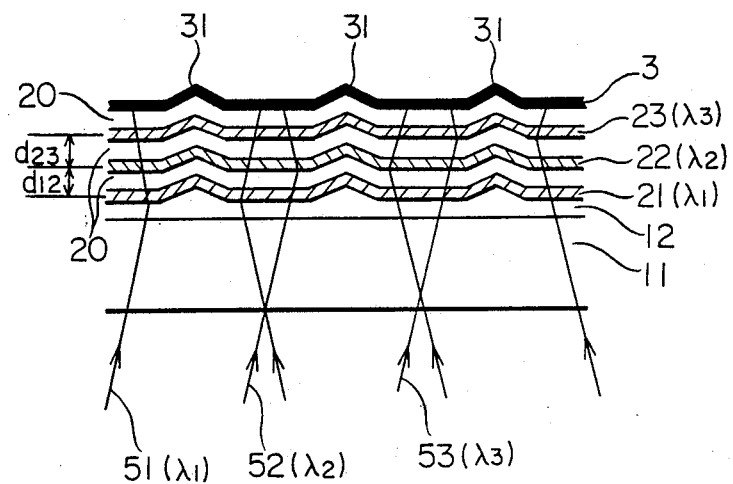
FIG. 1 is a cross-sectional diagram of the recording medium embodying the present invention.

In FIG. 1 showing the cross-section of the optical recording medium pertinent to this invention, a glass or plastic disc substrate 11 is processed to form a replica layer 12 having a groove or pits for tracking control and pits for recording the track address, synchronizing signal and the like. The substrate 11 and replica layer 12 can also be manufactured integrally by injection formation. A plurality of optical recording layers 21, 22 and 23 having waveform sensitivities are laminated on a transparent resin layer 20 which is formed by evaporation or distances d12 and d23 between the adjacent recording layers are made consistent with the interval of focal positions, so that laser beams of specific wavelengths are focused on the corresponding recording layers. For example, in the case of a 0.1 μm/nm focal position biasing caused by chromatic aberration, and a 20 nm interval of absorption spectrum peaks of the wavelength multiplexing recording medium 21-23, the recording layers are made to have a distance d12 and d23 of 2 μm.

Next, the wavelength multiplexing optical recording apparatus according to one embodiment of this invention will be described. The wavelength multiplexing recording medium 1 has the cross-sectional structure as described above on FIG. 1, and it is rotated by a motor 10. Semiconductor lasers 61-63 and optical detectors 71-73, same in number, are disposed. The semiconductor lasers 61-63 have output laser beams 51-53 collimated with respective collimator lenses 41-43 and, after being merged into a single beam by beam combining devices 81-83, conducted to the focal lens 93, by which individual laser beams are projected differently due to the chromatic aberration of the lens 93 onto respective recording layers 21-23 having wavelength sensitivities on the recording medium 1 as described on FIG. 1. As shown in FIG. 1, in order for the laser spots to differentiate their positions in the planar direction of the recording medium, the laser beams incident to the focusing lens 93 need to have their incident angles slightly different from one another. This is accomplished, for example, by adjusting the inclination of the beam combining devices 81-83, so that the directions of the laser beams reflected by the devices and directed to the focusing lens are adjusted. The reflected laser beam from the recording medium is separated into beams of individual wavelengths by beam splitting devices 84-86, and detected separately. In this embodiment, the beam combining devices 81-83 and beam splitting devices 84-86 are beam splitters with associated dichroic mirrors of dielectric multiple layered film. The beam combining device 82 transmits the light 51 with wavelength $\lambda_1$ and of p-polarization (linear polarization in the plane of drawing), and reflects the light 52 with wavelength $\lambda_2$ and of p-polarization. The beam splitting device 86 reflects the light 53 with wavelength $\lambda_3$ and of s-polarization (linear polarization in perpendicular to the drawing), and transmits the lights 51 and 52 with wavelengths $\lambda_2$ and $\lambda_1$ and of s-polarization. A polarized beam splitter 91 has characteristics of transmitting the p-polarized light and reflecting the s-polarized light in the whole wavelength range including $\lambda_1$-$\lambda_3$. A wavelength plate 92 functions as a quarter-wave plate at the center wavelength of $\lambda_1$-$\lambda_3$. Accordingly, the reflected laser beam from the recording medium 1 becomes an s-polarized light, and it is kicked out toward the optical sensors 71-73 by the polarization beam splitter 91.

Figure 2:
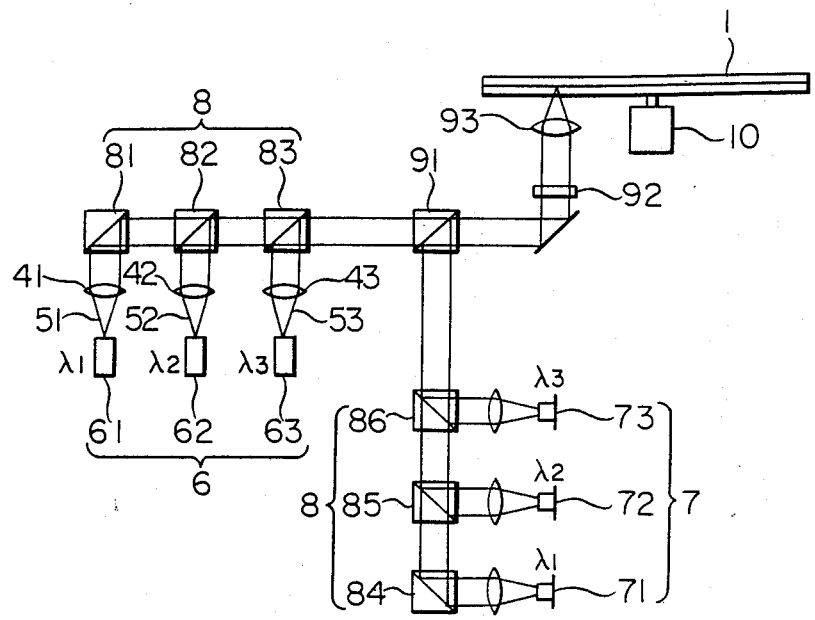
FIG. 2 is a systematic diagram of the optical recording-reproduction apparatus embodying the present invention.

Although in FIG. 2 optical detecting systems necessary for automatic focusing and automatic tracking, and other components such as a lens actuator are not shown for clarifying the explanation, these devices as well as a currently available optical disk drive unit are of course required to complete the apparatus.

A question arising at this point is that a laser beam of which wavelength should be used for detecting the bias of focal point and deviation of tracking. For the recording medium 1 having the cross-section as shown in FIG. 1, in which the reflective layer 3 functions as a reference of detecting the focal point bias and tracking error, it is desirable to use the laser beam of wavelength $\lambda_3$ corresponding to the recording layer 23 closest to the reflective layer 3. Namely, the optical system for focal point bias detection and/or the optical system for tracking error detection is linked to the laser beam 53 of wavelength $\lambda_3$ kicked out by the beam splitting device 86 in FIG. 2. An alternative possible way is that a laser beam with a wavelength which does not interfere with any recording layer is projected to the reflective layer, with a focal point bias detecting optical system and/or tracking error detecting optical system being set in the light path of the reflected beam. Well known optical systems for detecting the focal point bias and tracking error, such as those disclosed in for example U.S. Pat. No. 4,450,547 and U.S. Pat. No. 4,525,826 can be employed.

As described in connection with FIGS. 1 and 2, by stably positioning laser beams of different wavelengths to the laminated recording layers, recording and reproduction take place efficiently in each wavelength and recording and reproduction can be performed by operating all wavelengths simultaneously. Namely, the information transfer rate is enhanced by the degree of contribution of the wavelength multiplexing. In case the distances between adjacent recording layers do not match with the focal point bias caused by the chromatic aberration of the lens, it will be necessary for recording and reproduction to move the lens in the optical axis direction for each wavelength. In this case, the information transfer rate is the same as the case of a single wavelength, and the effectiveness of wavelength multiplexing is lost.

Figure 3A:
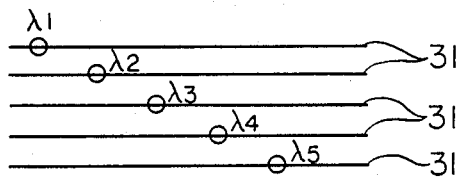
FIGS. 3A and 3B are diagrams showing the locations of laser spots on the surface of recording medium according to an embodiment of this invention.

Another embodiment of this invention will be described with reference to FIGS. 3A and 3B. These figures show the positional relationships between information tracks 31 and the laser spots of different wavelengths on the recording medium 1. In FIG. 3A, the laser spots are located individually on contiguous tracks, while in FIG. 3B all laser spots are located by being spaced from each other on a single track. In both cases of FIGS. 3A and 3B, the laser spots do not overlap in the planar direction on the recording medium. The laser spots have their focal positions biased separately in the medium cross-sectional direction, and are focused on the corresponding recording layers having wavelength sensitivities.

Figure 3B:
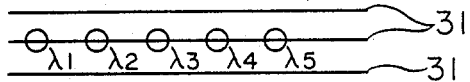

Positioning of the laser spots with a spacing being made between adjacent ones in the medium planar direction, as shown in FIGS. 3A and 3B, is accomplished by adjusting the inclination of reflecting surface of beam combining devices 81, 82 and 83 in the optical system of FIG. 2 so that the incident directions of the laser beams entering to the focusing lens 93 are slightly differentiated from one another.

Positioning of the laser spots as shown in FIGS. 3A and 3B reduces the thermal crosstalk between recording layers, and this is advantageous for recording information by simultaneously modulating laser beams of different wavelengths. Namely, information transfer rate is improved by wavelength multiplexing.

The present invention enables wavelength multiplexing optical memories of lamination type to record and reproduce information at better light utilization efficiency, stably for each recording layer, and in the state of less crosstalk between recording layers. Consequently, the recording density and information transfer rate of the optical memory is enhanced significantly by the scheme of wavelength multiplexing.

We claim:

1. A wavelength multiplexing optical recording apparatus comprising:
   a laser source radiating a plurality of laser beams of different wavelengths;
   an optical system for focusing said laser beams; and
   an optical recording medium consisting of a plurality of recording layers having wavelength sensitivities so that said layers are subjected to recording or reproduction selectively by said laser beams focused by said optical system, said layers being laminated with a distance between adjacent layers being made consistent to a difference of focal positions of said laser beams attributable to the chromatic aberration of said optical system, so that said laser beams are focused on recording layers having corresponding wavelength sensitivities.

2. An optical recording apparatus according to claim 1, wherein said optical recording medium includes a light reflective layer provided at the layer position farthest from the incident surface for said laser beams.

3. An optical recording apparatus according to claim 2, wherein a reflection laser beam derived from a laser beam used for recording and reproduction on the recording medium nearest to said reflective layer and reflected by said reflective layer is used for detecting a bias of focal point.

4. An optical recording apparatus according to claim 3, wherein said reflection laser beam is further used for detecting a tracking error.

5. An optical recording apparatus according to claim 2, wherein said laser source radiates a laser beam having a wavelength which does not interact with any of said recording layers, said laser beam, after being reflected by said reflective layer, being used for the detection of a bias of focal point.

6. An optical recording apparatus according to claim 5, wherein said reflection laser beam is further used for the detection of a tracking error.

7. An optical recording apparatus according to claim 1, wherein said plurality of laser beams are focused on said recording layers having corresponding wavelength sensitivities, without overlapping with one another in the plane of said recording layers.

8. A wavelength multiplexing optical recording apparatus comprising:
   an optical recording medium consisting of a plurality of laminated optical recording layers, said layers being recorded selectively by laser beams of different wavelengths;
   a plurality of laser sources of different wavelengths; and
   an optical system for focusing said laser beams on corresponding optical recording layers, said recording layers having distances of lamination made consistent with laser beam focal positions that are biased depending on the wavelength of said laser beam caused by the chromatic aberration of said focusing optical system.

9. A wavelength multiplexing optical recording apparatus comprising:
   an optical recording medium consisting of a plurality of laminated optical recording layers having wavelength sensitivities, with a light reflective layer being disposed at the final layer position seen from the light incident surface;
   a plurality of laser sources of different wavelengths; and
   an optical system for focusing said laser beams of different wavelengths, any of a laser beam having a wavelength for recording and reproducing selectively the recording layer nearest to said reflective layer and a laser beam having a wavelength which does not interact with any of said wavelength selective recording layers is used for the detection of focal point bias and the detection of tracking error.

* * * * *